United States Patent [19]
Beachley, Jr.

[11] 3,764,853
[45] Oct. 9, 1973

[54] MEANS FOR DUAL LEVEL GROUND FAULT PROTECTION OF A.C. CIRCUITS

[76] Inventor: Robert W. Beachley, Jr., P.O. Box 4492, Charlotte, N.C. 28204

[22] Filed: Dec. 27, 1971

[21] Appl. No.: 212,451

[52] U.S. Cl. ............... 317/18 D, 317/14 J, 317/38
[51] Int. Cl. ............................................. H02h 3/28
[58] Field of Search ............... 317/18 R, 18 D, 14 J, 317/36 TD, 38, 49, 101 R, 154, 18 B, 14 C

[56] References Cited
UNITED STATES PATENTS

| | | | |
|---|---|---|---|
| 3,585,452 | 6/1971 | Goodwin | 317/18 D |
| 2,333,537 | 11/1943 | Leonard | 317/14 J |
| 3,665,252 | 5/1972 | Rogers, Sr. et al. | 317/18 D |
| 3,634,839 | 1/1972 | Vassil et al. | 317/49 |
| 3,641,393 | 2/1972 | Florance et al. | 317/18 D |
| 3,402,326 | 9/1968 | Guasco et al. | 317/18 D |
| 3,636,482 | 1/1972 | Edmunds | 317/18 D |
| 3,504,188 | 3/1970 | Ficker | 317/101 R |

Primary Examiner—Gerald Goldberg
Attorney—William T. Hough et al.

[57] ABSTRACT

Circuitry for detection of ground fault currents in alternating current circuits utilizable with grounded or ungrounded systems and for protectively interrupting the circuits, comprises means for deriving monitoring signals from representative of the fault currents and applying the signals to first and second relays. The first relay is responsive at a low level of fault current to pass control current from a source of control power to warning such as a lamp and horn. The second relay is responsive at a higher level of fault current to pass control current to an interrupter device for the circuits being monitored. Adjustment means in the circuitry sets the two threshold levels of fault current at which the relays respectively respond. Seal-in circuit means keep the first relay actuated to activate the alarms continuously after their operation is initiated. A time delay network prevents relay response to instantaneous transient currents exceeding the lower threshold. The circuitry is unitized for use at any standard voltage, current and frequency and to isolate all current carrying components. The circuits being monitored can serve as a source of control power or an independent source can be provided.

2 Claims, 5 Drawing Figures

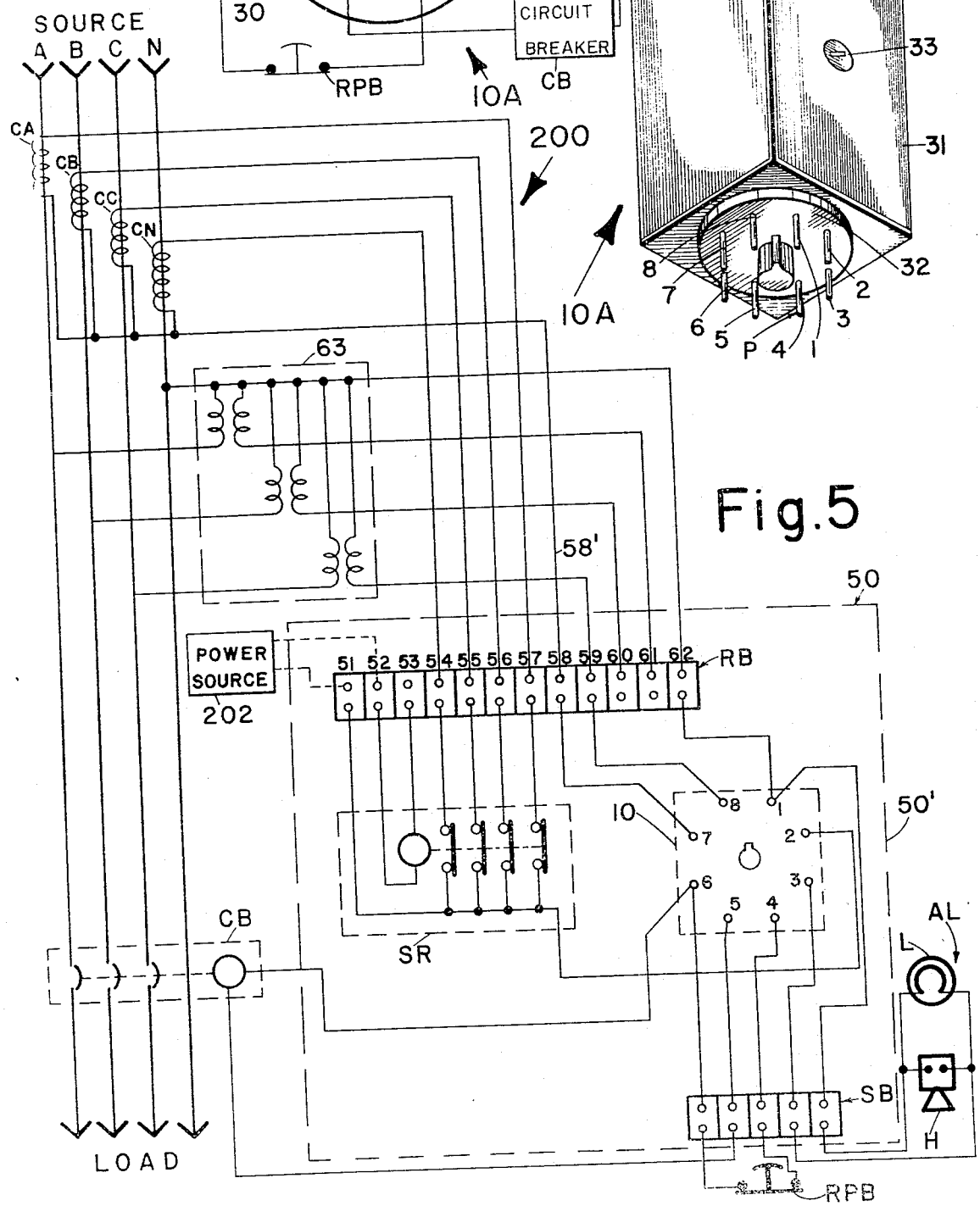
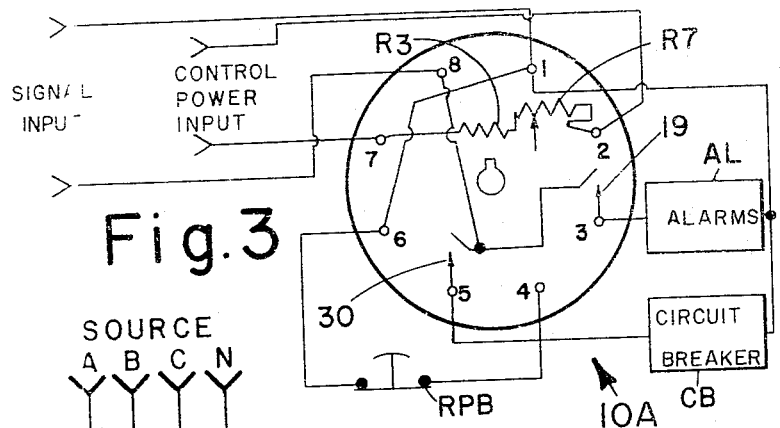
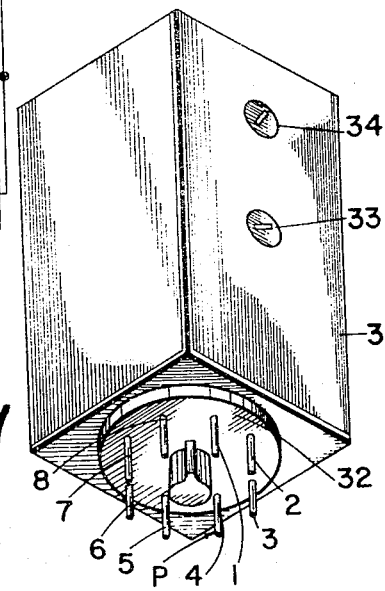
Fig.2
Fig.3
Fig.5

MEANS FOR DUAL LEVEL GROUND FAULT PROTECTION OF A.C. CIRCUITS

This invention concerns means for dual level of ground fault protection of an alternating current circuit by providing early warning of a ground fault at a predetermined low magnitude of fault current, and by interrupting the circuit at a higher magnitude of fault current.

It is known in the art, that one of the most troublesome and dangerous conditions encountered in operation of electrical power circuits is for a conductor in the circuit to experience a fault whereby current flows to ground and does not follow the intended proper circuit paths of the conductor. Ground fault detectors are known which provide early warning of trouble developing, so that corrective measures can be taken by repairmen to search out the fault and eliminate it before the circuit faults itself out of service, or possibly cause a fire hazard. To be of value as an early warning device, such a detectors usually operates at very low current levels or magnitudes, giving warning of faults at 1% to 5% of circuit ampacity (current carrying capacity). Ground fault interrupters are also known which will operate a switch or circuit breaker to put the faulting circuit out of service. Such interrupters usually operate at from 10 percent to 100 percent of circuit ampacity. Also known are sensitive ground fault interrupters which operate to interrupt the circuit in the low milliampere range of ground faults and are sometimes called "people protectors."

In the present art, "people protectors" work well but respond at too low a current level or magnitude, when the primary object is only to protect equipment and eliminate fire hazards or prevent destructive failure of a circuit, but to continue operation of the circuit with a slight fault. Prior known ground fault detectors do give warning, but if the warning is not heeded, a failure of equipment, fire or destructive circuit failure can result. Prior ground fault interrupters do protect electrical equipment and can eliminate fire hazards and destructive failure of a circuit in the event of occurrence of a ground fault in a circuit. However, they have the disadvantage of suddenly interrupting the circuit, shutting down a process and causing sudden, expensive delays in processes without warning.

The present invention corrects the shortcomings of currently known ground fault detectors and circuit interrupters by providing a system which when installed on an alternating current circuit gives early warning if one of the circuit conductors incurs a slight leakage to ground of current not exceeding a predetermined first low level or magnitude. The system further provides that if the magnitude of leakage current increases to predetermined higher level or magnitude, a signal is initiated to interrupt power supplied to the circuit. The invention also provides a utilized unit embodying circuitry of the system, switch features which enable the unit to be used with various fault detection means.

It is therefore, a first object of the invention to provide a system including a two-stage relay circuit for detection of ground fault currents in alternating current circuits, adapted to respond to such currents at two different predetermined current levels or magnitudes, so that at a lower level a warning or alarm is activated, and a higher level, circuit disconnecting means is operated.

A second object of the invention is to provide a system as described in the first object with means whereby the lower level or magnitude of fault current tolerated before an early warning signal or alarm is actuated is variable by the user within certain limits. These limits may for example be 1 percent to 3 percent of circuit ampacity, but the invention is not restricted to this range. The threshold level and width of the range may be selected and built into the system by proper selection of circuit components.

A third object is to provide a system as described in the second object with means to make the early warning signal or alarm positive and permanent by means of a seal-in or holding circuit which makes the early warning signal or alarm continuous until reset by an attendant. The system further includes a time delay feature to prevent nuisance warning signals in the event of temporary small, negligible faults.

A fourth object is to provide a system as described above with whereby the higher level or magnitude of fault current tolerated before a signal to interrupt the circuit is initiated by the two-stage relay, can be adjusted by the user within prescribed limits. These limits may be for example 5 percent to 20 percent of circuit ampacity, but the invention is not restricted to this range.

A fifth object is to provide a system as describe above with a unitized enclosure for the two-stage relay constituting a unit which can be used with a circuit of any voltage, any standard frequency, and any ampacity. A sixth object is to provide a system as described above with additional circuitry all housed in a sealed enclosure, having terminal blocks or receptacles on the exterior of the enclosure to facilitate external connections, maintenance and replacement.

A seventh object is to provide means for making the unitized sealed enclosure safe from electric shock by having all current carrying parts enclosed or inaccessible to touch while energized.

An eighth object is to make the unitized enclosure and its circuitry safe from damage due to excessive overload of input signal circuit caused by sudden violent faults in the alternating current circuit on which the unit is installed.

A ninth object is to provide electrical isolation of the incoming ground fault current from control circuitry within the two-stage relay circuit.

A tenth object of the invention is to provide the unit with means making it universal in it application so that it will accept signals from many different types of sources, and which may be supplied with control power from the system it is monitoring and protecting, or which may be supplied with control power from another power source.

For further comprehension of the invention, and of the objects and advantages thereof, and of further features thereof, reference will be made to the following detailed description and accompanying drawings, and to the appended claims in which the various novel features of the invention are more particularly set forth.

In the accompanying drawings from a material part of this disclosure:

FIG. 2 is a isometric view of a unit comprising an enclosure with octal base for the two-stage relay circuit.

FIG. 3 is a diagram of the unit of FIG. 2 showing terminal connections.

FIG. 5 is a circuit diagram of another power distribution circuit being monitored by the early warning and circuit interruption signal means of FIG. 1, including a current transformer for each phase of the power distribution circuit, a shorting relay and terminal boards enabling the two-stage relay circuit to give early warning alarms and to effect interruption of the power distribution circuit.

Figure 1:
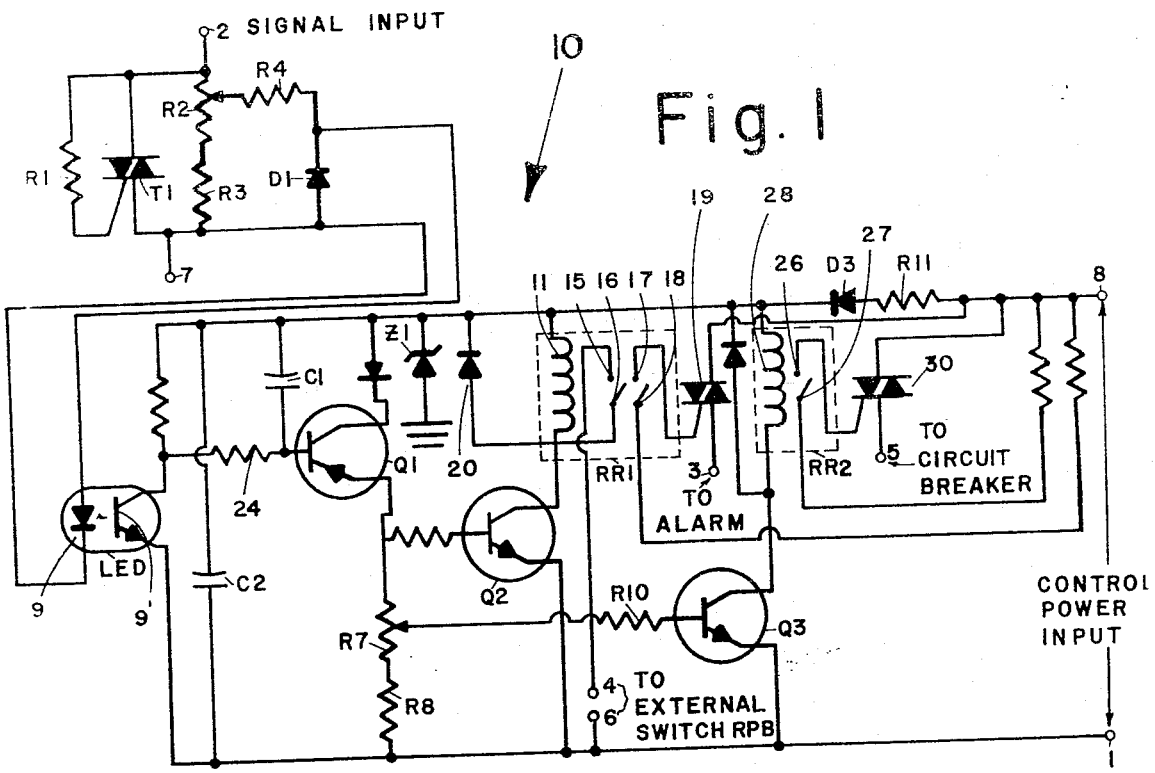
FIG. 1 is a diagram of an early warning and signal interruption circuit including a two-stage relay circuit, providing dual level of detection, giving one signal at each predetermined level of ground fault current.

Referring first to FIG. 1, there is shown the two-stage relay circuit 10 which operates as a dual level current detector. Circuit 10 is provided with eight terminals numbered respectively 1–8. Control power is applied to terminals 1 and 8. This control power may be applied at 120 volts, 60 Hz, for example. Other voltages and frequencies, or even direct current may be applied, provided that circuit components are chosen accordingly. The signal input being monitored is applied to terminals 2 and 7. Between these terminals, connected in series are fixed resistor R3 and variable resistor or potentiometer R2. Also connected between terminals 2 and 7 is fixed resistor R1 and triac T1. Resistor R1 sets the trigger level for triac T1 which protects the remainder of the circuit from high overload voltage conditions applied to terminals 2 and 7. Once triggered, triac T1 short circuits the input network between terminals 2 and 7 as long as the input voltage exceeds a predetermined magnitude, for example thirty volts. Resistors R2 and R3 determine the maximum and minimum limits of the lower level of current sensing. Resistor R3 acts as a limiter preventing adjustment of resistor R2 beyond the prescribed maximum limit. The response range at the lower level is variable by means of the resistor R2 which allows the threshold to be set for the signal activation at the lower level between maximum and minimum limits.

Diode D1 and resistor R4 are connected across the input resistors R2, R3. The diode D1 and resistor R4 protect the solid state light emitting diode LED from reverse voltage and overload current respectively. Diode LED has a diode section 9 and a phototransistor section 9'. Application of an input signal whose voltage or current exceeds a predetermined magnitude determined by adjustment of resistor R2, causes light emitting diode section 9 to illuminate phototransistor section 9'. The illuminated phototransistor is thus activated and in turn activates relay RR1. The phototransistor drives coil 11 in the relay which closes normally open contacts 15, 16 and 17, 18. The output of the phototransistor 9' is amplified by transistors Q1 and Q2 connected in cascade to the phototransistor. The output of transistor Q2 is applied to coil 11 of relay RR1. The two transistors Q1 and Q2 provide a very sensitive threshold for low input currents.

Once reed relay RR1 has been activated following light input to the phototransistor, solid state contacts 15, 16 and 17, 18 in relay RR1 close. Contacts 17, 18 cause application of control power from terminal 8 via triac 19 to terminal 3 for application to a remote warning or alarm device AL shown in FIGS. 3, 4, and 5. Terminal 3 is connected to the triac. When this triac is triggered by closure of contacts 17, 18 the triac closes the circuit between terminal 8 and terminal 5. Contacts 15, 16 serve as seal-in means in a holding circuit with coil 11 to keep this coil energized by control power via external normally closed reset pushbutton switch RPB connected to terminals 4 and 6. The holding circuit connected between terminals 1 and 8 is normally open at contacts 15, 16. The contacts of relay RR1 will remain closed as long as the signal input voltage or current remains above the threshold values as set by potentiometer R2. With the external switch RPB in closed position, contacts 15, 16 and 17, 18 of relay RR1 remain closed even if the input signal applied to terminals 2 and 7 is no longer present or falls below the set threshold value. This seal-in feature is provided to prevent a momentary fault signal from being ignored. However capacitor C1 in conjunction with resistor 24 constitutes a time delay circuit which provided a predetermined time delay between the instant of threshold crossing by the input signal and the instant of activation of relay RR1. This time delay prevents response to instantaneous, transient, while permitting response to momentary signal overloads. As a result undesired nuisance warnings resulting from normally occurring transient signals are prevented.

Diode D3, resistor R11, diode Z1 and capacitor C2 connected between terminals 1 and 8, constitute a regulated power supply network for the signal sensing circuit. This network allows operation at varying input line voltages. For properly selected components, this line voltage may be as low as 80 volts AC RMS, where circuit 10 is designed for 120 volts AC RMS voltage.

In operation of curcuit 10 as the magnitude of the input signal increases, four critical values are noted: each threshold having two critical values. The lower threshold has a minimum value below which there is no relay action and an upper limit of adjustment beyond which the lower level signal will always respond. As adjustment by means of potentiometer R2 is provided whereby the user may change the lower level up to but not exceed a maximum value, so that no matter what setting of the adjustment, the relay RR1 will always respond at the set value which must be at or below the maximum value of the lower level adjustment. By way of illustration only, realistic settings of these two levels may be (but are not limited to, within the scope of invention) 1% and 3% of the circuit ampacity. The adjustment just described provides that the required signal input for an early warning of the presence of ground fault can be set by the user within these limits.

Circuit 10 responds at the higher threshold when ground faults of greater magnitude are experienced and in responding provides control power from circuit 10 to operate an external trip device such as a shunt trip circuit breaker to interrupt power to the circuit being monitored. The higher threshold has a minimum set point and a maximum set point and the user may adjust for any desired point of operation between these limits. By way of illustration only, realistic values of these two set points may be 5 percent and 20 percent of the circuit ampacity. The manner of higher threshold adjustment will now be described.

The higher threshold comes into use when the magnitude of input signal is such that it is desired to have automatic interruption of the circuit being monitored at a higher level, beyond which the magnitude of the ground fault current is liable to be a hazard to the total electrical system. When the signal magnitude reaches the higher threshold set point, control power is delivered from terminal 8 to output terminal 5 by action of reed relay RR2 triggered through resistors R7, R10 and transistor Q3. The values of resistors R7 and R8 are chosen to limit the output interrupting signal within limits adjustable by manual setting of resistor or potentiometer R7 by an attendant. Resistor R8 limits the user's adjustment so that the setting cannot be greater than a designated safe value for interruption at the higher threshold. Output terminal 5 will be connected to an external circuit breaker CB shown in FIGS. 3, 4 and 5 for opening the monitored circuit. Relay RR2 has normally open contacts 26, 27 which are closed when sufficient current is applied to relay coil 28. Coil 28 is connected in series circuit with transistor Q3 and control power input terminals 1 and 8. This transistor A3 is triggered on when voltage or current at the higher threshold is applied via variable resistor R7 and resistor R10 from transistor Q1. Contacts 26, 27 are connected in series with triac transistor 30 and output terminal 5. The triac 30 is triggered to conduct when contacts 26, 27 close for application of operative current via terminal 5 to a circuit breaker or other circuit interrupter.

FIG. 2 shows a unit 10A which can house the circuitry of the two stage relay circuit 10. This unit includes a sealed metal on plastic enclosure or housing 31 generally rectangular in form and provided with an octal base 32 having a central locating key 36 and eight projecting pins or prongs P which serve respectively as terminals 1-8 of circuit 10 shown in FIG. 1. The unit can be inserted into a standard octal socket 10B shown in FIG. 4 to which are connected external components described in connection with FIGS. 1, 3 and 4. On one side of housing 31 are two adjustment screws 33 and 34 arranged respectively for adjusting resistors R2 and R7 shown in FIG. 1. Adjustment of screw 33 determines low level threshold and adjustment of screw 34 determine the high level threshold. The circuit 10 in housing 31 can be potted or encapsulated.

FIG. 3 shows schematically the unit 10A embodying circuit 10. The control power is applied to terminals 1 and 8. The signal input is applied to terminals 2 and 7. The early warning alarms AL are connected between terminals 3 and 1. The external circuit breaker CB is connected between terminal 5 and 1. Triac 19 is represented as switch between terminals 3 and 8. Triac 30 is represented as a switch between terminals 5 and 8. Resistors R3 and R2 which control the low level adjustment are connected between terminal 2 and 7.

Figure 4:
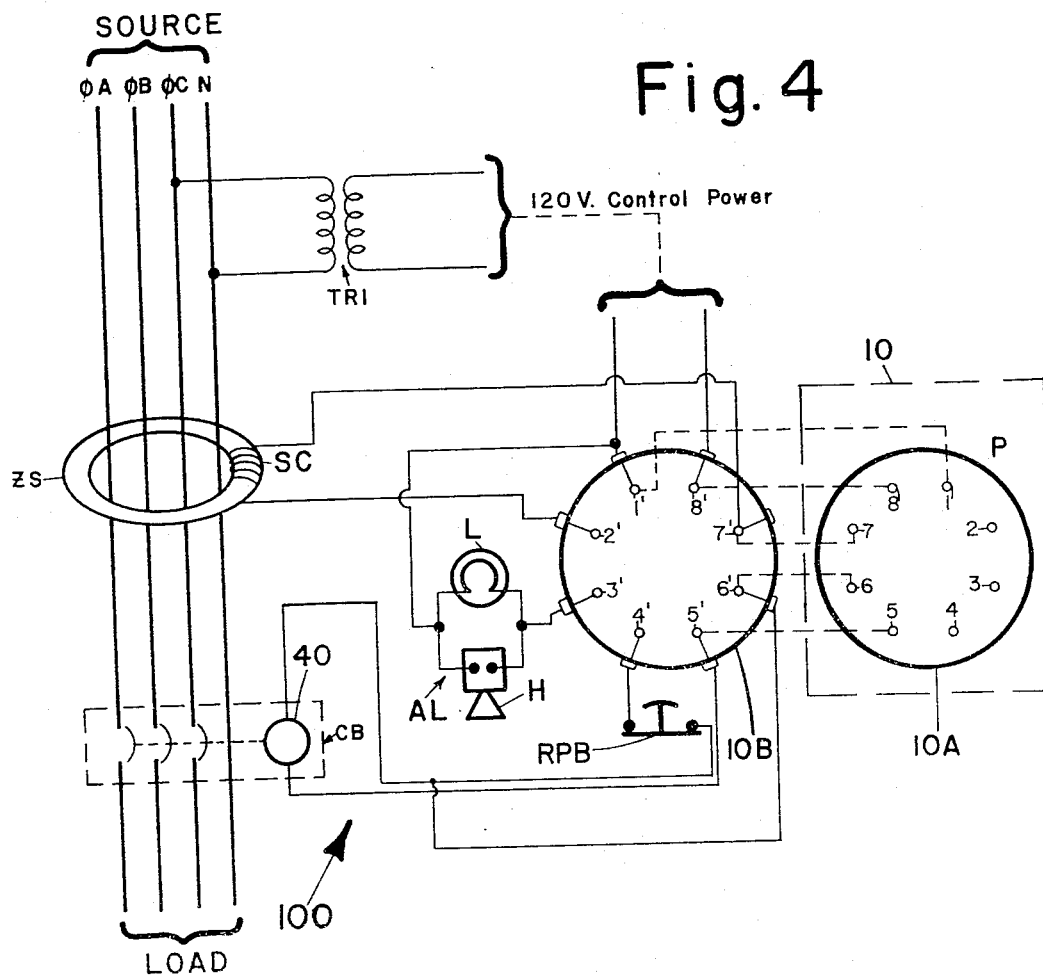
FIG. 4 is a circuit diagram of a power distribution circuit being monitored by the early warning and circuit interruption signal means of FIG. 1, along with audible and visual alarms, and means to interrupt supply of power to the circuit being monitored.

FIG. 4 shows circuit 100 in which unit 10A embodying circuit 10 is inserted into circuit 100 by mounting the unit on octal socket 10B. This socket has terminal contacts 1' – 8' which respectively receive pins P of unit 10A. The load circuit being monitored and protected by unit 10A has three phase power supply lines 0A, 0B, 0C and neutral line N. Transformer TR1 is connected between one line such as line 0C and neutral line N to provide single phase control power which is applied to terminals 1' and 8' of socket 10B. Zero sequence transformer ZS encircles the lines. Secondary winding SC of this transformer is connected to terminals 2' and 7' to provide the input signal to circuit 10 in unit 10A. Circuit breaker CB is arranged to open all three phase lines. Operating solenoid 40 of the circuit breaker is connected between socket terminals 5' and 6'. External reset pushbutton switch RPB is connected between terminals 4' and 6'. Alarms AL comprising a lamp L and horn H are connected between terminals 3' and 1'.

Circuit 100 gives early warning by visual and audible means in the event of a ground fault current of low magnitude. In the event that the value of the ground fault current should increase to trigger the second threshold of relay circuit 10, the power will be interrupted to the load. The source of power for the circuit being monitored can be of any voltage alternating current and of any ampacity. As shown, the source may be three-phase, four-wire such as 416Y/2400, 480Y/277 or 208Y/120 volts. The neutral N may be absent if the load is a three-phase load (not using the neutral). The circuit may be single phase, three-wire (such as 120/240 volts) in which case 0B phase would be absent. The circuit could be single phase two-wire, consisting of phase 0A and the neutral N. The operation of the detector/protector circuit 10 is the same for all of the above cases. All active wires of the circuit pass through Zero sequence transformer ZS which will sense a magnetic unbalance if there is a ground fault on the circuit of the load side of the zero sequence transformer ZS. The magnetic unbalance will be proportional to the magnitude of the ground fault current. If the zero sequence transformer ZS senses a magnetic unbalance it will induce a current in the secondary coil SC. When the current in coil SC grows to sufficient magnitude, the low level terminal 3 will be energized (see FIG. 2) turning on light L and operating horn H. Once the low level signal is initiated, it remains constant until reset by momentarily operating the reset pushbutton RPB. If the value of the fault current in coil SC remains above the value necessary to activate terminal 3, the reset pushbutton RPB will not void the light L and horn H. If the current in coil SC continues to increase and reaches a value sufficient to energize terminal 5 in relay 10 (see FIG. 1) the closing of terminal 5 will trigger the operating coil 40 of shunt trip circuit breaker CB to disconnect the load from the power source. The source of control power to terminals 1 and 8 relay 10 circuit is shown as 120 volts, 60 Hz. This control power can be obtained from the source of the circuit being monitored by use of control transformer TR1; or control power can be from a separate source. Relay circuit 10 can be operated from a direct current source of power, provided the operating coil 40 of circuit breaker CB, light L and horn H are selected for operation from a DC source.

FIG. 5 shows circuit 200 in which relay circuit 10 is combined with auxiliary circuitry into one unit 50 in enclosure 50', that is universal in its application as a dual level ground fault detector/protector for use with various arrangements of current transformers, zero sequence transformers and potential transformers. Housing 50' encloses relay circuit 10 and shorting relay SR. Terminal blocks RB and SB are mounted on the exterior of housing 50'. The low and high level adjustment resistors R2 and R7 (FIG. 1) will be accessible from the exterior of housing 50'.

FIG. 5 shows the universal unit 50 applied to circuitry where one current transformer is used for each active conductor. The current transformers CA, CB, CC, and CN are shown connectd to terminals 57, 56, 55 and 54 of receiving terminal block RB, with their common connection line 58' connected to terminal 58, which is internally connected to terminal 7 of relay circuit 10. In this arrangement, the current transformers are connected in parallel and any ground fault current will cause a proportional current to flow in line 58'. This arrangement of current transformers is normally used for metering and as connected here they are available for metering exterior to the universal unit 50 by connections from terminals 54, 55 56, 57 and 58 of terminal block RB. Shorting relay SR is provided within the universal unit 50. SR has normally closed contacts which, when metering is not in the circuit, closes the parallel circuits together, so that terminals 54, 55, 56 and 57 all close together and are connected through relay SR to terminal 2 of relay circuit 10 thus completing the input signal circuit to relay circuit 10.

The operation of relay circuit 10 is not distributed by the use of external metering. When external metering is being done, an external source of power 202 is applied to terminals 52 and 53 of terminal block RB which energizes relay SR and unshorts the current transformers to permit metering. During metering, the current transformer common line from the metering arrangement returns to the universal unit 50 to terminal 51 of terminal block RB, thus restoring the signal circuit to relay circuit 10. The features of unit 50 described will permit the use of universal unit 50 to add ground fault detection/protection to existing metering current transformers. Alternatively the universal unit 50 can be used with a zero sequence transformer ZS as in FIG. 4 by connecting the sensing coil SC to terminals 51 and 58 of terminal block RB. Likewise, with an existing metering arrangement the existing common return from the meters to the current transformers can be opened and connected to terminals 51 and 58 to accomplish the same result.

FIG. 5, shows a bank of transformers 63 connected in wye-wye from phase conductors A, B, C, and N. For operation of the dual level ground fault detector/protector, only a 120 volt 60 Hz connection is required to terminals 59 and 62 of terminal block RB. The additional connections are shown in case terminal block RB is used as an intermediate connection point from the circuit being monitored to metering external to the detector/protector. For this use terminals 59, 60, 61 of terminal block are connected as may be desired to external metering devices.

The external connections from terminal board SB of FIG. 5, are the same as the connections shown in FIG. 4 from like numbered terminals of relay circuit 10 to a reset pushbutton RPB, light L, horn H and shunt trip circuit breaker CB. Also light L, reset pushbutton RPB, audible signal H, circuit protective devices in the potential leads, and various additional signal lights or control switches can be mounted into the case of the universal unit 50 with no effect on the dual level function of relay circuit 10.

The bank of transformers 63 need not be connected in wye-wye as shown. It may be an existing open Delta Bank as is often used in metering. With an open Delta Bank; either terminal 60 or 61 would lack a connection, but for operation with the universal unit 50, terminals 59 and 62 must have the proper control voltage (usually 120 volts, 60 Hz). Also, transformer bank 63 shows both the primary and secondary neutral connected to the source neutral. In the event that universal unit 50 is being used for ground fault detection/protection on an ungrounded source, the primary neutrals of transformers 63 must not be connected to the ground. The primary neutrals are connected together and insulated from ground and from the secondary neutral, and the secondary neutrals transformer 63 are grounded. This must be done for an ungrounded source because a serious ground fault anywhere on the system would burn out the primary winding of the control transformer.

Another use of the universal unit 50 is possible with the current transformers CA, CB, CC and Cn all connected in series and their series loop closed to terminals 51 and 58. With this connection, each current transformer will produce a voltage in proportion to the current in the load conductor with the voltages cancelling vectorially for no ground fault current. With a ground fault current on nay load conductor, the voltages will not vectorially balance and the resultant voltage will be impressed on terminals 51 and 58 of the universal unit 50 and internally to terminals 2 and 7 of relay circuit 10 providing the required signal for operation of the detector/protector unit.

Other additions and modifications may be made to universal unit 50 without affecting its universality or altering the basic intent of having a two stage relay. For example; terminal block RB could be two terminal blocks with one block connected to receive incoming C/T leads and voltage leads and the second terminal block intended for continuation of leads for external metering. An indicating meter or meters could be built into the housing of unit 50 to perhaps indicate ground fault current, system voltages, or conductor currents. The connections to terminal boards RB and SB could be cord connected with multiconductor plugs rather than terminals as shown, thus allowing easy replacement of an entire unit 50 should maintenance be required.

While I have illustrated and described the preferred embodiments of my invention, it is to be understood that I do not limit myself to the precise constructions herein disclosed and that various changes and modifications may be made within the scope of the invention and defined in the appended claims.

What is claimed is:

1. A multi-stage relay circuitry for dual-level detection of ground fault currents in alternating current circuits of one or more phases and for protectively interrupting the circuits, comprising in combination: first unitary-circuit means for deriving and for responding to a monitoring phase signal of which the deriving circuitry is common to any or all phases monitored, the monitoring phase signal being representative of fault current and the magnitude thereof in at least one of the phases of the monitored alternating current circuits, said first unitary-circuit means being comprised of a signal minimum and maximum-threshold means including connected in parallel (a) a minimum-threshold circuit including in series a minimum-resistance resistor and a solid-state light-emitting diode LED, in parallel with (b) a maximum-threshold resistor means, and in parallel with (c) a maximum-threshold short-circuiting means for short-circuiting the signal of a magnitude greater than the signal of the maximum-threshold of the maximum-threshold resistor means, said solid-state light-emitting diode LED including a power input lead and a transistor output lead, there being also included a power-reducing resistor in series with the input lead, and connected to said input lead between said input lead and said power-reducing resistor there being a time-delay resistor-capacitor combination means, and including a gate transistor having the time-delay resistor-capacitor combination means connected operatively to gate terminal of the gate transistor, with the input lead of the gate transistor connected to a power source, and there further being included each of an alarm relay means and a circuit-breaking relay means each connected in series with the output lead of the light-emitting diode LED and each also connected to the output lead of the gate transistor, and additionally there being in series between the circuit-breaking relay means and the light-emitting diode LED a second resistor means limiting the maximum current therethrough prior to current exceeding the resistance of the second resistor means being activatable of said circuit-breaking relay means; and including a current-switch means and circuitry thereof operatively positioned relative to and as a part of the first relay means as a seal-in circuit for maintaining the first relay in a closed state-position following activation of the first relay means, and the switch means including a manually operable circuit-breaking switch for breaking the circuit of the switch means manually.

2. A multi-stage relay circuitry of claim 1, in which the minimum-threshold circuit further includes a variable resistor in series with and prior-to each of the minimum-resistance resistor and the maximum-threshold resistor means, in which said maximum-threshold short-circuiting means includes in parallel with the variable resistor a third resistor means and in series with the third resistor means a gate transistor means having a gate terminal connected to the third resistor means which sets the trigger-level, with the input lead of the short-circuit gate transistor means connected in parallel with said variable resistor and with the output lead of the short-circuit gate transistor means connected in parallel with said light-emitting diode LED's activation-signal output lead such that said light-emitting diode LED is by-passable by excessively high magnitudes of current being short-circuited through said gate transistor means of the short-circuiting means, and in which said second resistor means including a variable resistor having a resistor track with opposite ends with one end connected in series with the time-delay combination means-gate transistor's output terminal and connected to the remaining end of the resistor track there being a fixed resistor in series with the power-output lead of the light-emitting diode LED, and the second resistor means variable resistor further including an adjustable contactor variable along the track, the second resistor means variable resistor contactor being an outlet lead connected to said circuit-breaking relay means.

* * * * *